United States Patent [19]
Crossley et al.

[11] Patent Number: 5,638,198
[45] Date of Patent: Jun. 10, 1997

[54] COLOR FILTER IN MULTIPLICITY OF FILAMENTS FOR ELECTRONIC DISPLAYS

[75] Inventors: John W. Crossley, Upper Black Eddy; Dorel Toma, New Hope, both of Pa.

[73] Assignee: Raphael Glass, Plumsteadville, Pa.

[21] Appl. No.: 344,037

[22] Filed: Nov. 22, 1994

[51] Int. Cl.$^6$ .................................. G02F 1/335
[52] U.S. Cl. .......................... 349/104; 349/110
[58] Field of Search .................. 359/66, 67, 68

[56] References Cited

U.S. PATENT DOCUMENTS

| | | | |
|---|---|---|---|
| 4,846,546 | 7/1989 | Cuda | 385/116 |
| 5,144,415 | 9/1992 | Takanashi et al. | 359/68 |
| 5,321,789 | 6/1994 | Kida et al. | 385/133 |
| 5,333,227 | 7/1994 | Ishiharada et al. | 385/100 |
| 5,361,320 | 11/1994 | Liu et al. | 359/87 |

*Primary Examiner*—Wael Fahmy
*Assistant Examiner*—Fetsum Abraham
*Attorney, Agent, or Firm*—Pennie & Edmonds

[57] ABSTRACT

A color filter for an electronic display comprises a plurality of elongate colored filaments bonded together in parallel such that the first ends of the filters form a first planar surface of the filter and the second ends form a second planar surface of the filter. A color filter for an electronic display comprises a plurality of elongate filaments bonded together such that the longitudinal axes of the filaments are substantially coplanar. A method for making a color filter of short filaments comprises bonding the filaments into a ribbon, assembling these ribbons into a block and slicing thin layers from this block in a direction perpendicular to the filaments. A method for making a color filter of short filaments comprises casting a matrix around a plurality of spaced apart filaments, solidifying the matrix, and slicing the matrix and embedded filaments in a direction perpendicular to the filaments. A method for making a color filter comprises bonding a plurality of differently colored films into a block and slicing this block perpendicular to the planes of the films. The filaments, made of optically transparent materials such as glass or plastic, may have a variety of cross sectional shapes, such as circular, rectangular and hexagonal.

18 Claims, 7 Drawing Sheets

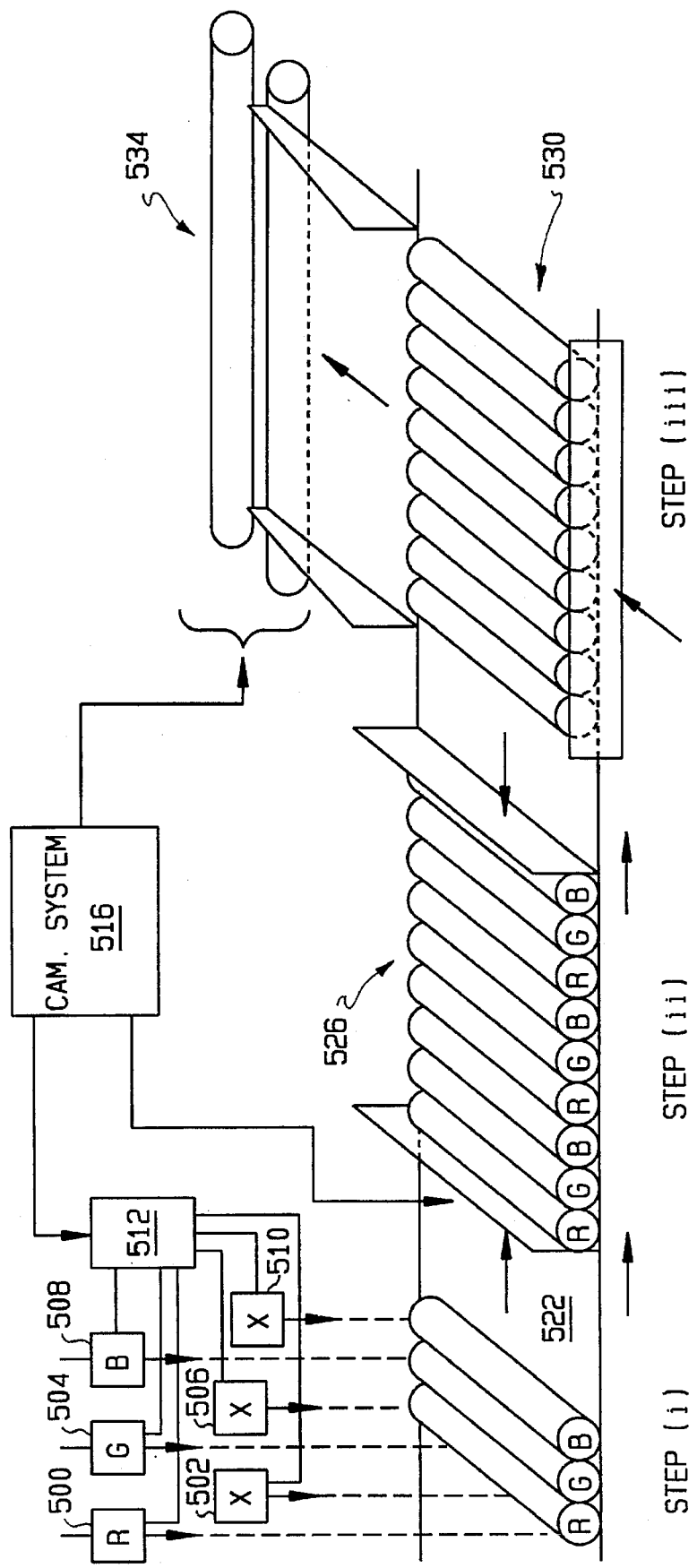

COLOR FILTER IN MULTIPLICITY OF FILAMENTS FOR ELECTRONIC DISPLAYS

FIELD OF THE INVENTION

This invention relates to color filters for electronic displays, and more particularly to filters of elongate pigmented filaments for liquid crystal display devices that have high resolution, are easily manufactured, have a high color consistency, and require minimum inspection.

BACKGROUND OF THE INVENTION

Electronic displays are commonly used to display computer-generated digital data or video images. They are used in a wide variety of products including, but not limited to, computers, medical instruments, radar systems, and television sets.

Color liquid crystal displays ("LCD's") embody one of the more common display technologies. Color LCD's include a color filter layer commonly made of a transparent glass substrate coated with green, blue and red dots or stripes ("dots") of dye. These dots are grouped in triads of one red, one blue and one green dot, which together correspond to a single pixel. For common displays, such as those used in computer systems the dots measure between 100 and 300 microns in diameter.

These red, green and blue dots are made by printing the colored dyes on the surface of the substrate. There are drawbacks to manufacturing a color filter by a printing process, however. The printing dyes degrade when heated, and LCD displays are relatively hot. The result is that LCD displays typically have a practical lifespan of less than 2000 hours before color changes result. Since the heating is not homogeneous across the display, the color change of individual pixels may become apparent even before this lifespan is reached in some applications. The displays are difficult to create reliably. Printing produces color regions of inconsistent thickness that cause variations in color across the surface of an LCD display. The color layer, even when carefully printed, must be later polished to provide a surface smooth enough to allow necessary electrodes to be formed on its surface. Polishing is not without risk. It can damage or remove the thin color layer from individual display pixels. A few damaged dots may cause an entire color filter to be scrapped. The printing process often fails to print individual dots as well. Since the dyes are applied in a liquid state, dust may be entrained in the printed color regions. These dust particles block light, form voids, and further increase variations in color filter thickness.

All the aforementioned problems make it difficult to create inexpensive color filters for electronic displays.

It is an object of this invention to produce a color filter for electronic displays having a consistent thickness and optical properties. It is a further object of this invention to create a display that can be polished while reducing the risk that the color layer will peel off the transparent substrate. It is a further object of this invention to increase the color filter's capacity to be polished without damage. It is a further object of this invention to allow the production of smaller pixels at reduced cost. It is a further object to create a color filter having a long life.

SUMMARY OF THE INVENTION

The present invention relates to a colored filter for an electronic display made of a plurality of parallel elongate filaments having a central longitudinal axis, a first end and a second end. The longitudinal axis of each filament is parallel to the longitudinal axes of the other filaments, the first ends of the filaments form a first plane surface of the filter, and the second ends of the filaments form a second plane surface of the filter.

Each of the filaments in the filter transmits one of three colors. These colors may be red, green and blue. The filaments may have colored transparent core and a layer of cladding surrounding the colored transparent core. This cladding may be, transparent or opaque. If opaque, the preferred cladding color is black. If transparent, the index of refraction of the cladding must be less than the index of refraction of the core.

According to the present invention, the filaments may have a variety of shapes and sizes. The filaments in the filter may be substantially circular in cross section, preferably with a diameter of between 80 and 120 microns. Alternatively, the filaments in the filter may be substantially rectangular in cross section, having first and second cross sectional thicknesses measuring between 60 and 120 microns and between 180 and 360 microns respectively. The filaments in the filter may be substantially hexagonal in cross section, measuring between 80 and 120 microns in cross sectional thickness. The filaments may be made of glass, such as fused silica glass, optical quality soda-lime glass, lead crystal glass, barium glass or borosilicate glass. The filaments also may be made of plastic.

The present invention further relates to a colored filter for an electronic display comprising a plurality of parallel filaments, each of the filaments having a central longitudinal axis, a first longitudinal surface and a second longitudinal surface, where the longitudinal axis of each of the plurality of filaments is parallel to, and substantially coplanar with, all others of the longitudinal axes of the plurality of filaments, and wherein the first longitudinal surfaces of the plurality of filaments form a first planar surface of the filter, and where the second longitudinal surfaces of the plurality of filaments forms a second planar surface of the color filter.

The present invention further relates to an LCD electronic display comprising a planar array of liquid crystal light shutters and a color filter as set forth in this Summary of the Invention, where the filter overlaps the planar array such that light passing through the planar array is filtered by said filter.

The present invention further relates to an LCD electronic display comprised of a first transparent substrate, a color filter as set forth above, a first electrode layer, a liquid crystal layer, a second electrode layer, and a second transparent substrate.

The present invention relates to a method for making a color filter including the steps of bonding a plurality of transparent colored filaments together to form a ribbon, where the filaments in the ribbons are substantially coplanar and parallel; bonding a plurality of the ribbons together to form a filament block, where the plurality of filaments in the block are substantially parallel; slicing the block into thin layers, each of these layers having a first planar surface and a second planar surface, where the first and second planar surfaces are substantially parallel to each other, and are perpendicular to the longitudinal axes of the plurality of filaments.

The present invention further relates to a method for making a color filter comprising the steps of: bonding a plurality of transparent colored films together to form a block, where the films in the block are substantially parallel; slicing the block into thin layers having a first and a second planar surface, wherein the first and second planar surfaces are substantially parallel to each other and are perpendicular to the colored films in said block.

The present invention further relates to a method for making a color filter comprising the steps of: arranging a plurality of transparent colored filaments in spaced apart relation such that the filaments are substantially parallel; filling the spaces between the spaced apart filaments with a liquid polymer; solidifying the liquid polymer to create a solid matrix with embedded filaments; slicing the matrix and embedded filaments into thin layers having first and second planar surfaces such that the first and second planar surfaces are substantially parallel to each other and are perpendicular to the longitudinal axes of the filaments.

Cathode ray tubes (CRT's) may also use a color filter in accordance with the present invention. Normally, a CRT uses three different phosphors applied to the back of a clear substrate to produce a three color display. Applying the three phosphors to the substrate in precise spatial alignment and depth is difficult. According to the present invention, the three phosphors and clear substrate could be replaced with a single white phosphor and color filter of the subject invention.

BRIEF DESCRIPTION OF THE DRAWINGS

These and other features, objects, and advantages of the present invention will become more apparent from the detailed description in conjunction with the appended drawings in which:

FIG. 5 illustrates a system for assembling individual colored filaments;

DETAILED DESCRIPTION

Rather than apply a phosphor, pigment or dye in a thin film on the back of a colorless transparent glass substrate in order to produce colored light as taught in the prior art, the present invention uses the bulk color properties of various transparent filaments in order to filter light of different frequencies.

Figure 1A:
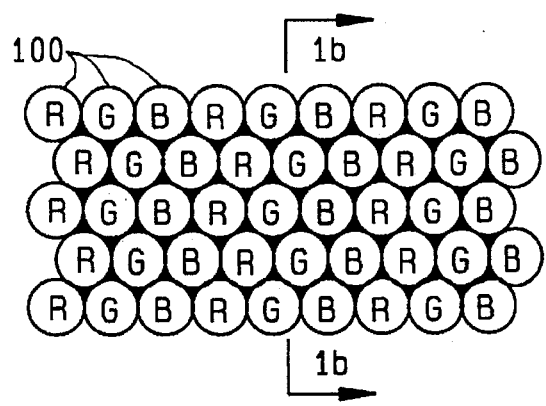
FIGS. 1(a) and 1(b) illustrate a plan view and a cross-sectional view, respectively, of one embodiment of the color filter of the present invention.
Figure 1B:
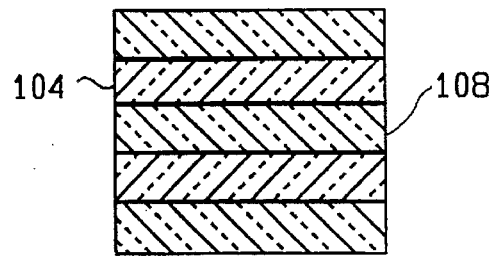

FIGS. 1(a) and 1(b) show one embodiment of a color filter in accordance with the subject invention which will be referred to as a short filament filter. This filter is made of a plurality of short colored transparent filaments 100, bonded together with their longitudinal axes parallel such that one end of the filaments collectively form a planar front surface 104 and the other end of the filaments collectively form a planar back surface 108 of the filter. The longitudinal axes of these filaments are parallel to each other and are normal to the front and back surfaces of the filter. The filaments that comprise the filter are ordered in both horizontally and vertically repeating patterns 112 of three primary colors, typically red, green and blue.

Figure 2A:
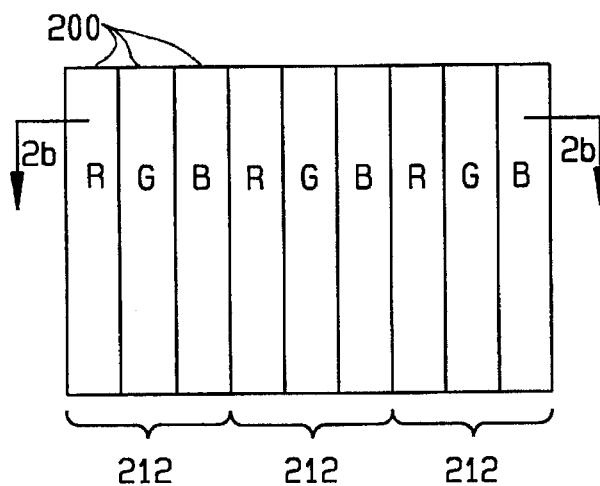
FIGS. 2(a) and 2(b) illustrate a plan view and a cross-sectional view, respectively, of another embodiment of the color filter of the present invention.
Figure 2B:
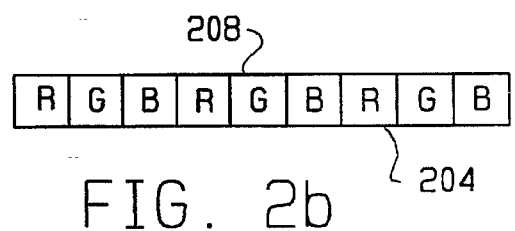

FIGS. 2(a) and 2(b) show a second filter in accordance with the present invention. This filter is called a long filament filter. In this embodiment, a plurality of long transparent colored filaments 200 are bonded together along their longitudinal surfaces or edges such that their longitudinal axes are coplanar and parallel to a front surface and a back surface of the filter. Each of the filaments has a front longitudinal surface and a back longitudinal surface, the front surface of the filaments collectively forming the front surface of the filter 204, and the back surfaces of the filaments collectively forming the back surface 208 of the filter. The filaments are arranged in repeating patterns 212 of three primary colors, typically red, green, and blue.

Light incident on one surface of the filter of the present invention is transmitted through the filter and is emitted from the other surface of the filter.

Color filters according to the present invention are of particular value for use in small electronic displays, such as ones having a plurality of small pixels that are difficult or expensive to manufacture by traditional methods as described above. Such displays commonly have a pixel center-to-center distance of less than 600 microns. Standard sizes for the fine-pitch displays of the present invention are between 50 by 125 pixels to 1280 by 1024 pixels or more.

Any filament material used is subject to several requirements. First, it must have a high visible light transmissivity without significant color shift over time, even at elevated temperatures. Second, since the filaments are typically quite thin, the base filament material must be able to mix with a relatively high percentage of colorant without cracking or otherwise degrading. Third, it must be stable at elevated temperatures, and not craze or crack. The preferred base materials for making glass filaments, therefore, are fused silica glass, barium glass, borosilicate glass, optical quality soda-lime glass, or lead crystal glass. The preferred material for making plastic filaments is poly-methylmethacrylate. The foregoing are the preferred materials, however any plastic or glass having good light transmission in the visible spectrum, the ability to incorporate the required high percentages of colorants without becoming degraded, and superior thermal stability would be acceptable. The colorants (typically oxides) added to the base materials above will depend on the particular colors to be produced by the filaments themselves.

Table 1, below, lists the colorants recommended to produce the appropriate red, blue, or green colors in these glasses for filters having an RGB color scheme.

TABLE 1

| Color | Colorants |
| --- | --- |
| blue | red iron oxide and selenium |
| blue | iron oxide |
| blue | vanadium or vanadium oxide |
| green | selenium, cadmium, and zinc oxide |
| green | copper carbonate and chrome oxide |

TABLE 1-continued

| Color | Colorants |
| --- | --- |
| green | praseodymium or praseodymium oxide |
| red | copper carbonate and tin oxide |
| red | gold |

One of the main advantages of the color filter described herein is its uniformity of color. Since the individual colored dots that comprise the pixel may be produced at different times, the glass melting, mixing and drawing process must be carefully controlled to produce homogeneous filaments.

The raw materials that are melted to produce the molten filament material must be carefully and thoroughly premixed prior to melting to insure a homogeneous melt.

Figure 3:
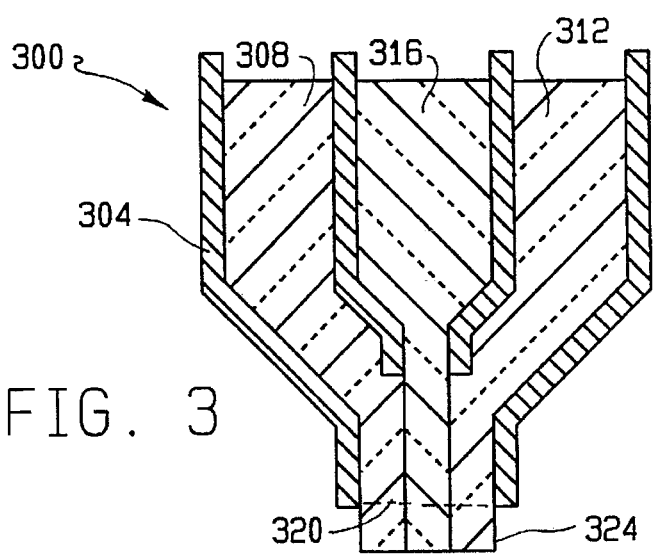
FIG. 3 illustrates a cross-sectional view of a double crucible for producing a clad filament.

FIG. 3 illustrates a preferred technique of producing a clad filament for use in a color filter using a double crucible 300. As shown in cross-section in FIG. 3, double crucible 300 is an arrangement of two crucibles, an outer crucible 304 for holding a molten cladding material 308, and an inner crucible 312 for holding a molten filament material 316.

The crucibles are open at the bottom 320 allowing molten cladding material to contact molten filament material. To draw a clad filament, the molten material is released from the bottom 320 of the crucibles through an orifice, forming a single clad filament 324.

This technique can be used to produce either glass or plastic filaments. Other methods of drawing clad filaments are presented in Glass Science & Technology, Vol. 2, Academic Press, New York 1984.

Filaments may be drawn having a variety of cross-sectional shapes. Square, circular, or hexagonal filaments are preferred. It is preferable to use round, hexagonal or square filaments for the short filament filters of FIGS. 1(a) and 1(b). Square filaments are preferred in the long filament filters of FIGS. 2(a) and 2(b).

Figure 4A:
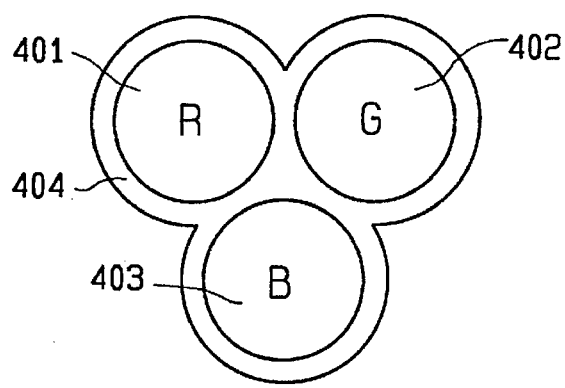
FIGS. 4(a) through 4(c) illustrate cross-sectional views of several preferred filter pixel arrangements in accordance with the present invention.
Figure 4B:
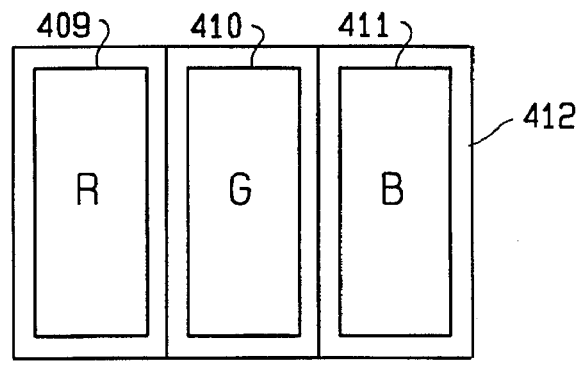
Figure 4C:
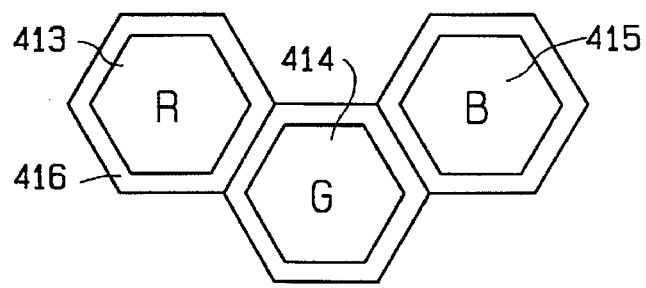

FIGS. 4(a)–(c) illustrate cross-sections of several preferred short filament filter pixel arrangements using filaments with different cross sectional shapes. FIG. 4(a) shows a triangular arrangement of circular filaments 401–403 clad with an opaque cladding 404. FIG. 4(b) shows an arrangement of rectangular filaments 409–411, also clad with an opaque cladding 412. FIG. 4(c) shows an arrangement of hexagonal filaments 413–415, also clad with an opaque cladding 416. Filaments with these cross-sectional shapes are particularly capable of transmitting light efficiently, yet also allow close arrangement with adjacent filaments, thus providing a bright image with a small pixel size.

The filament cladding shown in FIGS. 4(a) through 4(c) is used to prevent light from leaking between adjacent filaments. Although an opaque black material is shown here, non-opaque cladding materials are acceptable, preferably transparent materials with an index of refraction less than the index of refraction of the colored filament it surrounds. An example can be found in U.S. Pat. No. 3,139,340: an optical flint glass core (refractive index=1.75) clad with a crown glass or soda lime glass cladding (refractive index=1.52).

For plastic filaments, fluoro-polymers such as Lumeleen by Poly Optical Products provide several advantages when used as a cladding material: low cost, high density, good light transmittance efficiency, and superior heat resistance. For example, model PH-4001 has a thermal shrinkage of 0% for 2000 hours of service at 135 degrees Celsius. A full description of the technical specifications for poly-methylmethacrylate filaments is presented by Fumio Ide and Takashi Yayamoto in "Advanced Plastic and Optical Fibers", *Optical Fiber Materials & Processing*, Vol. 172, Ed Fleming (1991).

The cladding thickness is preferably in the range of 10 microns or less—a thickness which will not interfere with the red, green, or blue colors.

A good discussion of light propagation through filaments, clad and otherwise, can be found in A. L. Pedrotti & L. S. Pedrotti, *Introduction to Optics*, Prentice-Hall, 1987.

Several methods may be used to create a color filter. A long filament filter may be created by bonding a plurality of filaments together at their respective longitudinal edges to create a ribbon. Alternatively, a block comprised of alternating colored transparent films may be sliced perpendicularly to the plane of the films to create a long filament filter.

A short filament filter may be created by bonding a plurality of these ribbons together to create a filament block, then slicing this block perpendicularly to the longitudinal axes of the filaments in the block. Short filament filters can also be created by casting or injection molding a matrix, either colored or opaque around a plurality of individual filaments. These methods are described in more detail below.

FIG. 5 shows a system for assembling individual colored filaments into a ribbon-like long filament color filter. Metering reservoirs 500, 504, 508 are filled with red, green and blue colored filaments, respectively. These reservoirs are controlled by a reservoir metering system 512, that is in turn controlled by computer aided manufacturing system ("CAM") 516. These reservoirs meter out the red, green and blue filaments on surface 522. Surface 522 moves relative to the metering means as the filaments are released.

Additional opaque filaments may be metered onto surface 522 from reservoirs 502, 506 and 510 and positioned between the colored filaments to create an opaque barrier between the colored filaments. Positioning opaque filaments between colored filaments is especially useful when the colored filaments are not clad.

Once metered onto surface 522, the filaments are then aligned as shown at item 526. Finally, the filaments are bonded together to form a ribbon or sheet. This is shown at item 530. Both glass and plastic filaments may be bonded using heated roller system 534. Other methods may also be used to bond the filaments, such as adhesives or solvent fusion. Fabrication of optical fiber ribbons is described in M. Calvin, *Optical Fiber Splices and Connectors, Theory & Methods*, New York, (1986) and in U.S. Pat. No. 5,312,570.

Figure 6A:
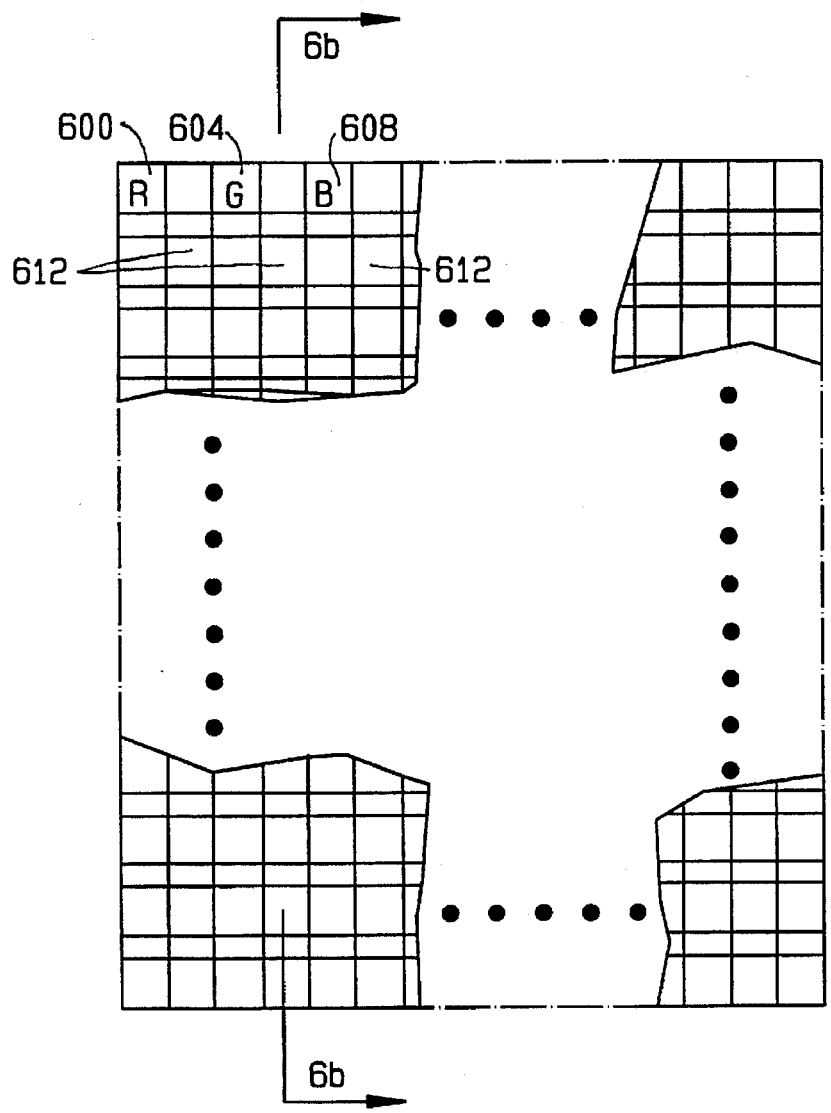
FIGS. 6(a) and 6(b) show additional details of a preferred embodiment of a long filament filter.
Figure 6B:
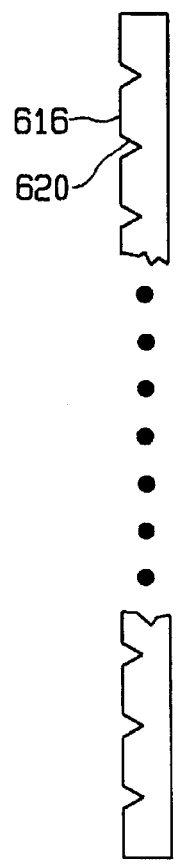

FIGS. 6(a) and (b) show additional details of a preferred embodiment of a long filament filter comprised of rectangular filaments. In this embodiment, the filter is comprised of repeating sequences of elongate red 600, green 604, and blue 608 filaments (labeled here as "R", "G", and "B"), which are oriented in parallel and bonded together, wherein each colored filament is spaced apart from its two adjoining colored filaments by opaque filaments 612. Opaque cladding or reflective coatings may be used in place of opaque filaments 612.

The back surface 616 of the long filament filter is marked with parallel grooves 620 perpendicular to the longitudinal axes of the filaments. These grooves are preferably made with an automated laser system, typically using a YAG:Nd or $CO_2$ laser. The interior surfaces of grooves 620 are made opaque, preferably by depositing an opaque colorant, such as chrome oxide, on the groove surfaces. The grooves, in combination with the opaque cladding 612 create a horizontally and vertically repeating sequence of three color pixels. Each rectangular filament in this embodiment preferably measures 60–120 by 180–360 microns in cross-section, and more preferably 100 by 300 microns.

Figure 7:
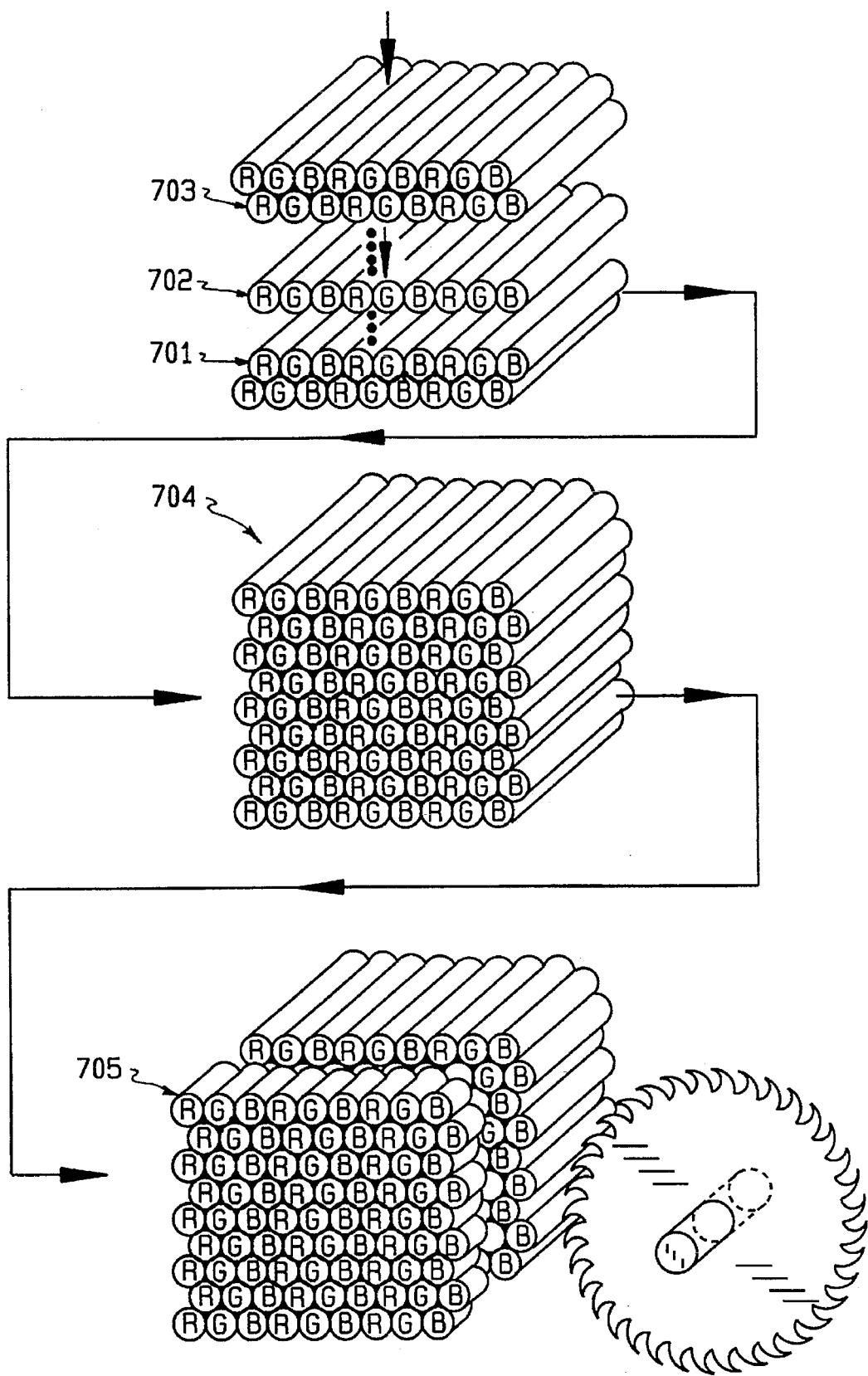
FIG. 7 illustrates one process for making a short filament filter.

FIG. 7 illustrates one process for making the short filament filter of FIG. 1. The filter may be manufactured by taking the fused ribbon 701 of red, green and blue filaments, typically formed as described above, stacking it with a plurality of other similar ribbons 702, 703, and bonding these separate ribbons together to create a filament block 704 of the desired cross section. The filaments comprising this block are oriented with their longitudinal axes in parallel alignment. In order to create a short filament filter from the filament block, the filament block must be sliced perpendicularly to the longitudinal axes of the filaments in the filament block. Each of these slices 705 may be fashioned into a short filament filter.

Figure 8:
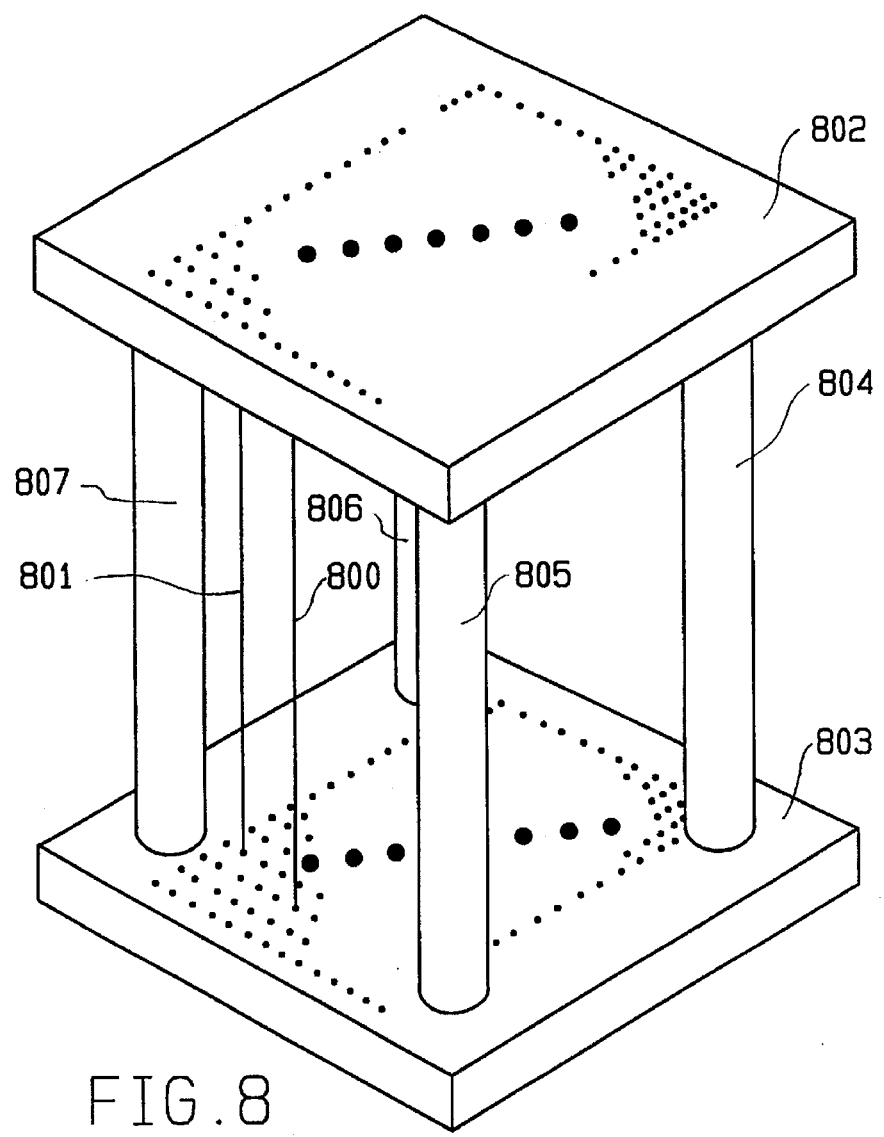
FIG. 8 illustrates a method of creating a filament block.

FIG. 8 illustrates another method of creating a filament block. In this method, two opposing plates 802, 803 are attached to a plurality of filaments (filaments 800 and 801 are shown, the rest are omitted for clarity) which are spaced apart from adjacent filaments. Tensioners 804–807 join plates 802, 803 and tension the filaments attached to the plates. Side walls (not shown) extend between plates 802, 803 and create a chamber that contains the filaments. A material such as an opaque epoxy is then cast or injected into this chamber which subsequently is solidified to create a filament block comprising a solid matrix with embedded filaments.

This filament block may then be sliced in a direction perpendicular to the longitudinal axes of the filaments to create a plurality of short filament filters.

Figure 9:
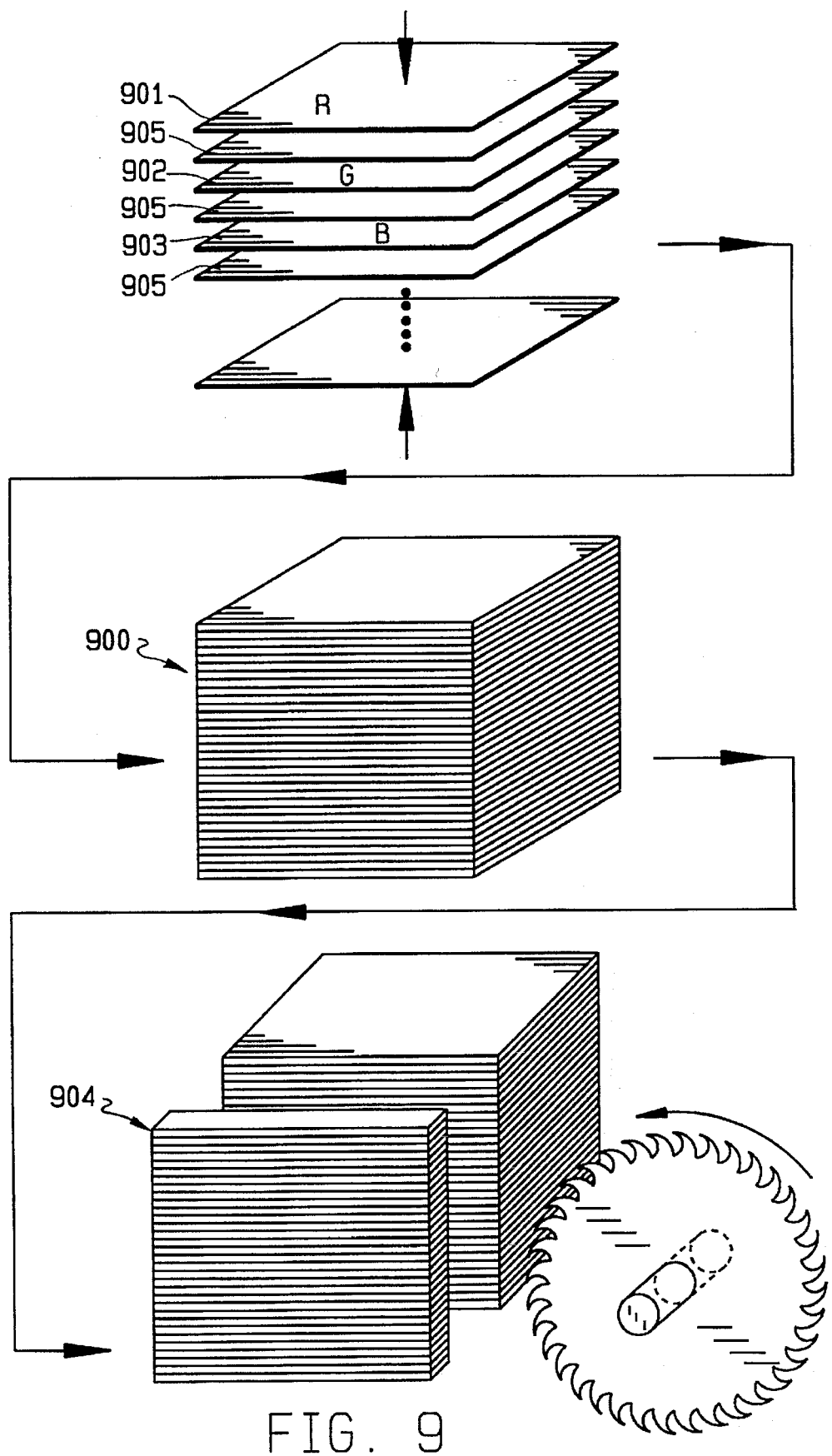
FIG. 9 illustrates a method of manufacturing a color filter.

FIG. 9 illustrates a method of producing a long filament filter from a block 900 comprising differently colored films 901–903. According to this method, thin films 901–903 of different colored glass or plastic are assembled into a block 900, which is then sliced in a direction normal to the plane of the films to create filter 904. The thin films may be created of the same materials as the filaments described herein. The colors of these films are likewise the same as the filament colors described herein, typically three primary colors such red, green and blue. To create a block, the films are arranged in parallel to each other and are bonded together to form a block. The films may be bonded mechanically, such as with an adhesive; chemically, such as by solvent fusion, or thermally, such as by heat fusion.

The films are ordered in the block in groups comprising individual films of at least three primary colors, such as red, green and blue. Adjacent groups in the block may comprise films with identical ordering (for example: {RGB}{RGB}{RGB}) or adjacent groups may comprise films in a different order (for example: {RGB}{RBG}{GRB}). Ordering the colored films differently in adjacent groups may help to reduce or eliminate any visual aliasing effects.

Additional layers 905 may be disposed between adjacent colored films to eliminate light leakage between the films as required. These layers may be an opaque adhesive, for example, or an actual film of opaque material such as a sheet of black glass or plastic. Alternatively, a transparent material may be disposed between the colored films as long as its index of refraction is smaller than the index of refraction of the colored films.

Once assembled, the block may be divided into long filament filters by slicing the block in a direction perpendicular to the plane of the individual sheets comprising the block. Each of these filters is preferably between 600 and 1500 microns thick. Most preferably the filters are between 1000 and 1100 microns thick.

Additional steps may be performed on both the short and long filament filters, such as lapping and polishing their front and back surfaces to improve light transmission. Lapping and polishing reduce back reflection and therefore improves the filter's light transmission. To further enhance light transmission, both light entrance and exit surfaces should preferably be parallel and flat. Lapping and polishing machines such as the Speedfam Machines, style BT or BTW, model 32 or 48, work acceptably.

When polymeric color filters are lapped or polished, a hot acid (such as $H_2SO_4$ at approximately 200 degrees Celsius) is preferred in order to dissolve the filament cladding. Once lapped and polished, a surface treated with acid should be neutralized with a base, such as NaOH.

Both the short and the long filament filters can be used with LCD electronic displays. In such an embodiment, the colored filter in accordance with the present invention is oriented over a planar array of liquid crystal shutters in order to filter light passing through the shutters. In a short filament filter, each filament has its own corresponding shutter, oriented in proximity to the filament so that the shutter regulates the amount of light passing through the filament that is presented to the viewer. In a long filament filter, each long filament of the plurality of filaments comprising the filter has a plurality of shutters associated with it. LCD shutters are typically organized in groups of three adjacent shutters such that each of the three shutters admits or denies light to a differently colored filament by varying amounts to allow the creation of an almost infinite variety of colors from the three adjacent filaments. The shutters, as described below are typically created from parallel planar electrodes that variously energize and deenergize a liquid crystal media disposed between the shutter electrodes thus causing the liquid crystal media to admit or deny light to its filament.

Figure 10:
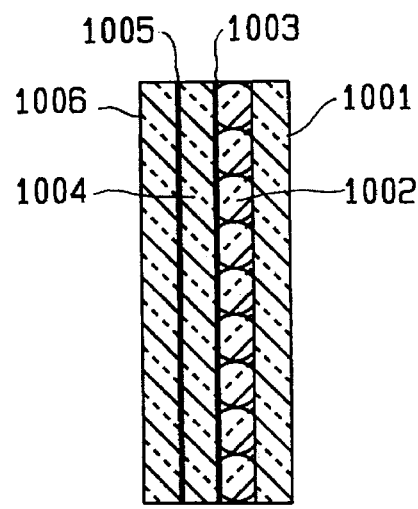
FIG. 10 illustrates a cross-sectional view of an electronic displays incorporating a color filter in accordance with the present invention.

FIG. 10 illustrates a cross section of an electronic display incorporating a color filter in accordance with the present invention. The display comprises a transparent substrate 1001, a color filter 1002, a first electrode layer 1003, a liquid crystal layer 1004, a second electrode layer 1005, and a second transparent substrate 1006.

Transparent substrate 1001 faces the person viewing the electronic display. Substrate 1001 is commonly made of glass or plastic.

Color filter 1002 is positioned behind substrate 1001. Color filter 1002 may be bonded to the substrate 1001 as necessary, usually by thermal fusion, adhesives, or chemical fusion techniques. In the event filter 1002 and substrate 1001 are of similar composition, the inner surface of the substrate and the outer surface of the filter can be heat or solvent fused to reduce or eliminate these two surfaces and their concomitant specular losses.

Behind filter 1002 is first electrode layer 1003. The function of the first and second electrode layers is to apply a voltage to liquid crystal layer 1004, thus causing the liquid crystal layer to change from transparent to opaque and from opaque to transparent. The first electrode layer is commonly composed of indium tin oxide (ITO), although there are other equally acceptable electrode materials that are well known in the art. A variety of common first and second electrode layer topologies may be found in E. Kaneko, *Liquid Crystal TV Displays: Principles and Applications of Liquid Crystal Displays*, KTK Scientific Publishers (1987).

The first electrode layer 1003 need not be deposited directly on the surface of filter 1002, but can be deposited on an intermediate layer or layers (not shown) positioned between first electrode layer 1003 and filter 1002. Such intermediate layers can be added to polarize or orient light passing through the LCD, to alter the surface characteristics of the elongate pigmented filaments thereby allowing better adhesion of the electrode layer, to provide light blocking between adjacent filaments, or to otherwise improve the optical characteristics of the electronic display. The polarizing effect will also reduce the amount of specular reflections from other surfaces in a multisurface display such as an LCD.

A liquid crystal layer 1004 is positioned between first electrode layer 1003 and second electrode layer 1005. Liquid crystal layer 1004 is altered by a voltage applied across the first and second electrode layers 1003, 1005.

Second electrode layer 1005 is positioned between second substrate 1006 and liquid crystal medium 1004. Second electrode layer 1005 may be deposited directly on second substrate 1006, or on an intermediate layer or layers positioned between the second electrode layer 1005 and the second substrate 1006. Second substrate 1006 is typically transparent glass or plastic that allows light to pass through the display.

As will be apparent to those skilled in the art, numerous modifications may be made within the spirit and scope of the invention.

What is claimed is:

1. A colored filter for an electronic display comprising:

a plurality of parallel elongate filaments bonded together, each of said filaments having a central longitudinal axis, a first end and a second end;

wherein the longitudinal axis of each of said plurality of filaments is parallel to the longitudinal axes of all others of said plurality of filaments, and wherein said first ends of said plurality of filaments form a first planar surface of said filter through which light is received substantially parallel to said longitudinal axes of said plurality of filaments, and where said second ends of said plurality of filaments form a second planar surface of said filter through which light exits.

2. The color filter set forth in claim 1 wherein said plurality of filaments comprise a first plurality of filaments having a first color, a second plurality of filaments having a second color and a third plurality of filaments having a third color.

3. The colored filter set forth in claim 2 wherein said first color is red, said second color is green and said third color is blue.

4. The color filter set forth in claim 1 wherein each of said plurality of filaments comprises a colored transparent core, and a layer of cladding surrounding said colored transparent core.

5. The color filter set forth in claim 4 wherein said layer of cladding is opaque.

6. The color filter set forth in claim 5 wherein said layer of cladding is black.

7. The color filter set forth in claim 4 wherein said layer of cladding has a first index of refraction, wherein said transparent core has a second index of refraction, and wherein said first index of refraction is less than said second index of refraction.

8. The colored filter set forth in claim 1 wherein each of said plurality of filaments is substantially circular in cross section.

9. The colored filter set forth in claim 8 wherein the diameter of each of said plurality of filaments is between 80 and 300 microns.

10. The colored filter set forth in claim 1 wherein each of said plurality of filaments is substantially rectangular in cross section, and has a first and a second cross sectional thickness.

11. The colored filter set forth in claim 10 wherein said first cross sectional thickness is between 60 and 120 microns, and wherein said second cross sectional thickness is between 180 and 360 microns.

12. The colored filter set forth in claim 1 wherein each of said plurality of filaments is substantially hexagonal in cross section.

13. The colored filter set forth in claim 12 wherein the cross sectional thickness of each of said plurality of filaments is 80 to 120 microns.

14. The colored filter set forth in claim 1 wherein each of said plurality of filaments is made of glass.

15. The colored filter set forth in claim 14 wherein said glass is selected from the group consisting of fused silica glass, lead crystal glass, optical quality soda lime glass, barium glass, and borosilicate glass.

16. The colored filter set forth in claim 14 wherein each of said plurality of filaments is made of plastic.

17. An LCD electronic display comprising:

a planar array of liquid crystal light shutters; and a color filter as set forth in claim 1, said filter overlapping said planar array such that light passing through said planar array is filtered by said filter.

18. An LCD electronic display comprising:

a first transparent substrate;

a color filter as set forth in claim 1;

a first electrode layer;

a liquid crystal layer;

a second electrode layer; and a second transparent substrate, wherein said color filter is located between said first transparent substrate and said first electrode layer, said first electrode layer is located between said color filter and said liquid crystal layer, said liquid crystal layer is located between said first and said second electrode layers, and said second electrode layer is located between said liquid crystal layer and said second transparent substrate.

\* \* \* \* \*